United States Patent [19]
Dlouhy

[11] Patent Number: 5,096,233
[45] Date of Patent: Mar. 17, 1992

[54] UNIVERSAL STANDPIPE ADAPTOR

[75] Inventor: Anthony S. Dlouhy, Stevensville, Mich.

[73] Assignee: Chardon Rubber Company, Chardon, Ohio

[21] Appl. No.: 621,046

[22] Filed: Nov. 29, 1990

[51] Int. Cl.$^5$ ............................................. F10L 41/00
[52] U.S. Cl. ................................... 285/153; 285/154; 285/177; 285/332.3; 285/334.3; 285/345
[58] Field of Search ................... 285/13, 14, 153, 154, 285/177, 332.3, 334.3, 340, 345

[56]  References Cited
U.S. PATENT DOCUMENTS

| | | | |
|---|---|---|---|
| 3,057,408 | 10/1962 | Griffitts | 285/345 X |
| 4,511,163 | 4/1985 | Harris et al. | 285/177 |
| 4,722,556 | 2/1988 | Todd | 285/177 X |
| 4,887,852 | 12/1989 | Hancock | 285/177 X |

*Primary Examiner*—Randolph A. Reese
*Assistant Examiner*—Heather Chun
*Attorney, Agent, or Firm*—Renner, Kenner, Greive, Bobak, Taylor & Weber

[57]  ABSTRACT

A universal adaptor (10) to facilitate the connection, and retention, of a drain hose (12) with the standpipe of a household sanitary system. One end portion (11) of the drain hose (12) has an inlet cuff (15) adapted to be secured to the discharge tube (16) of a household appliance (18). The universal adaptor (10) is presented from the other end portion (11) of the drain hose (12). The universal adaptor (10) has a generally cylindrical body portion (20) which terminates in oppositely disposed proximal and distal ends (23 and 28, respectively). A passageway (21) extends axially through the body portion (20) and opens through the oppositely located proximal and distal ends (23 and 28). The proximal end (23) is adapted to be secured to the drain hose (12). The body portion (20) also has outer surfaces (25 and 26). A plurality of flexible, frustro-conical fins (30) project conically outwardly from the outer surfaces (25 and 26). The fins (30) have progressively stepped outer diameters ($D_A$ through $D_G$), with that fin (30A) having the smallest outer diameter ($D_A$) located on proximity to the distal end (28) and with that fin (30G) having the largest outer diameter ($D_G$) located in proximity to proximal end (23) for engaging standpipes (13) having inner, diametral dimensions falling within a predetermined range.

7 Claims, 2 Drawing Sheets

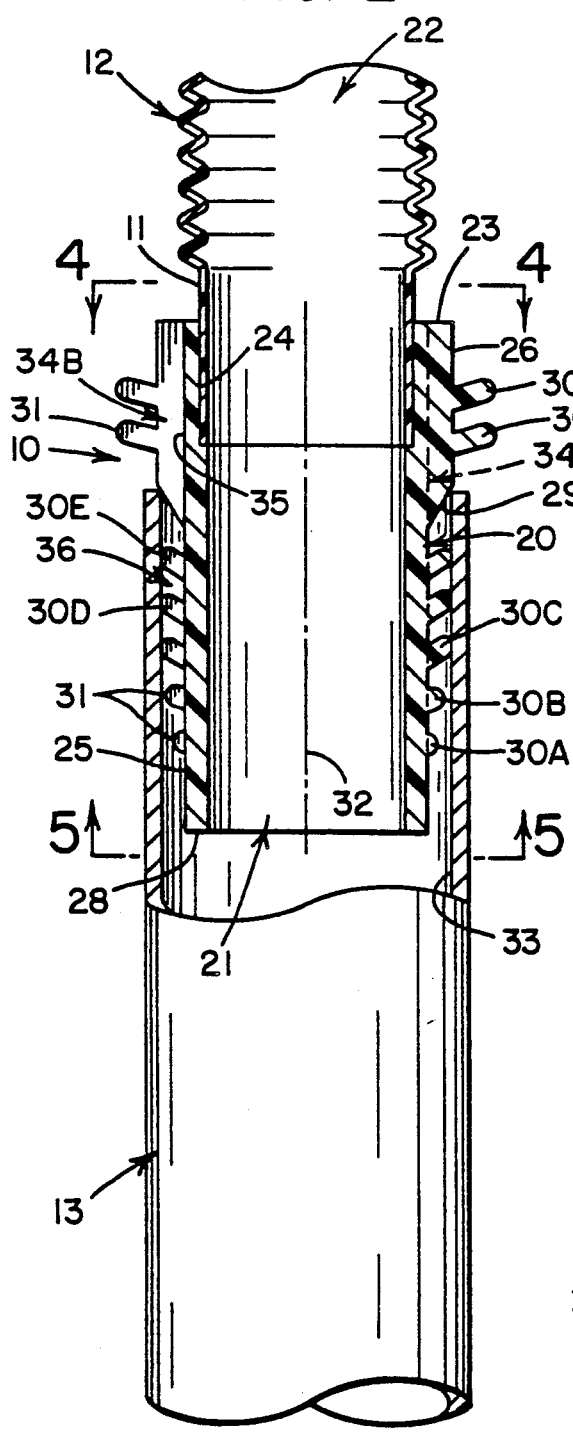
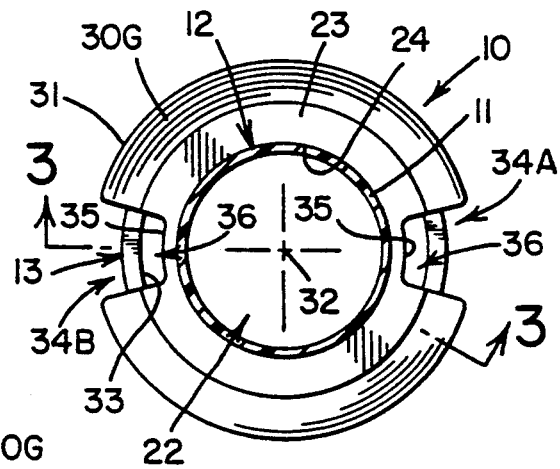
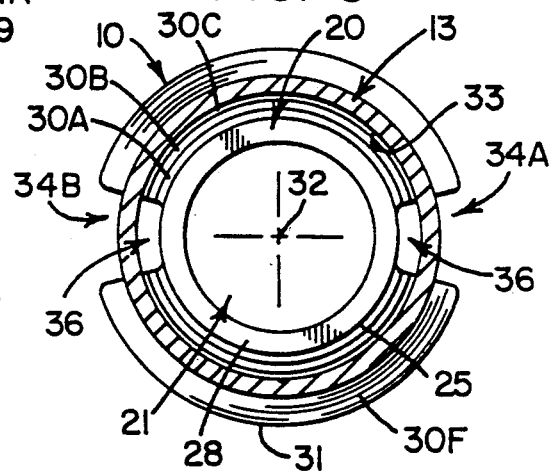
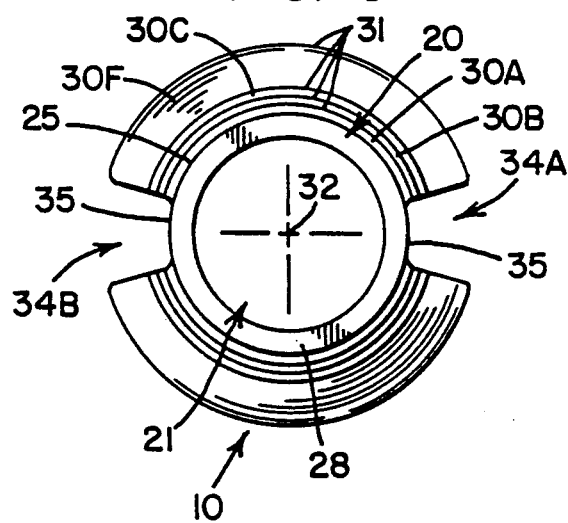

5,096,233

UNIVERSAL STANDPIPE ADAPTOR

TECHNICAL FIELD

The present invention relates to drain connections of the type particularly adapted for use in conjunction with household appliances. More particularly, the present invention relates to the connection between the standpipe presented by the household sanitary system and a drain hose which discharges waste fluid from a household appliance into the standpipe. Specifically, the present invention relates to an adaptor which permits a drain hose to be insertably received, and retained, within the full range of standpipe internal diameters normally encountered when installing household appliances.

BACKGROUND OF THE INVENTION

The present invention relates to drain hoses of the type having a first end which presents an inlet cuff, or the like, adapted to be connected to the discharge tube of a household appliance and having a second end which presents a connector means by which to effect communication with a standpipe, or the like, presented from the household sanitary system.

The drain hoses presently available are either intended to be loosely received within the standpipe or are provided with a connector of some configuration which permits the drain hose to be fixedly secured to the standpipe, or the like. Loosely inserting the drain hose into the standpipe has proven to be unacceptable because, under certain conditions, the pressure of the waste fluid exiting the drain hose will cause the drain hose to self-eject from the standpipe. Although a fixed connection between the drain hose and the standpipe will preclude inadvertent ejection of the drain hose from the standpipe, fixed connections of the type heretofore known require that the installer stock a plurality of components so he may employ the one that is best suited for the particular installation. This is necessary because of the wide range of internal diameters that can be encountered from one standpipe to another. As a result, it is necessary for the installer to maintain an inventory and to have a number of different diameter drain connectors available on site so that a return to the shop for parts will not generally be necessary.

If the connector means is molded integrally to the drain hose, an expensive inventory of pre-assembled drain hoses must be maintained, and the service vehicle must have sufficient space to carry a selection of drain hoses fitted with different size connector means as well as any other necessary parts. On the other hand, if the outlet connector means is not integrally molded to the drain hose, the installer will be obliged to assemble the connector means to the drain hose at the installation site. This procedure also requires the maintenance of a large inventory of connector means, and the necessary on-site assembly will consume additional time, thereby increasing the cost of installation.

SUMMARY OF THE INVENTION

It is, therefore, a primary object of the present invention to provide a universal adaptor which facilitates effecting an operable connection between the drain hose employed with a household appliance and the standpipe of a household sanitary system.

It is another object of the present invention to provide a universal adaptor, as above, which will effect the desired connection when the internal diameter of the standpipe falls within the customarily encountered dimensional range.

It is a further object of the present invention to provide a universal adaptor, as above, which incorporates a siphon break.

It is yet another object of the present invention to provide a universal adaptor, as above, which employs a plurality of flexible, substantially frustroconical fins on the outer surface thereof to interact with the interior of the standpipe and thereby retain the adaptor within the standpipe.

It is an even further object of the present invention to provide a universal adaptor, as above, which can be secured to, or be integrally formed on, one end of a drain hose to interact with a standpipe having internal diameters falling within a predetermined range.

It is a still further object of the present invention to provide a universal adaptor, as above, wherein the outer diameter of the fins are of progressively stepped diameters that preferably fall within the range of from approximately 1.47 to approximately 2.19 inches and which are disposed to interact with the cylindrical interior surface of standpipes falling within the range of from approximately 1.45 to approximately 2.05 inches, respectively, in order to effect a stable connection therebetween.

These and other objects of the invention, as well as the advantages thereof over existing and prior art forms, which will be apparent in view of the following detailed specification, are accomplished by means hereinafter described and claimed.

In general, a universal adaptor embodying the concepts of the present invention is presented from one end of a drain hose that is adapted to be connected to the discharge tube of a household appliance. The adaptor has a body portion with a passageway extending axially therethrough. Using the relative location of the drain hose as the directional reference, the passageway opens through the proximal and distal ends of the body portion. It is the proximal end, therefore, that is adapted to be secured to the drain hose.

The body portion also has an outer surface, and a plurality of flexible, fin means extend conically outwardly from the outer surface. The fin means have progressively stepped outer diameters with that fin having the smallest outside diameter being located closest to the distal end of the body portion and with that fin having the largest outside diameter being located closest to the proximal end of the body portion. The diametral dimensions of the conically tapered fin means are established to engage, and be retained within, the interior of that standpipe which communicates with the sanitary system and which itself has an interior, diametral dimension falling within a predetermined range.

One exemplary embodiment of a universal adaptor embodying the concepts of the present invention is described in detail and is deemed sufficient to effect a full disclosure of the subject invention. Although the exemplary adaptor is described in detail, it is done so without attempting to show all of the various forms and modifications in which the invention might be embodied; the invention being measured by the appended claims and not by the details of the specification.

BRIEF DESCRIPTION OF THE DRAWINGS

FIG. 2 is an enlarged vertical section taken substantially along line 2—2 of FIG. 1 in order to depict the cooperative interaction between the exterior configuration of the universal adaptor and the cylindrical interior of the standpipe;

FIG. 4 is a transverse section taken substantially along line 4—4 of FIG. 2, and it also appears on the same sheet of drawings as FIG. 2;

FIG. 5 is also a transverse section, but taken substantially along line 5—5 of FIG. 2, and it similarly appears on the same sheet of drawings as FIG. 2; and, FIG. 6 is an end elevation of the universal adaptor taken substantially along line 6—6 of FIG. 3, and it likewise appears on the same sheet of drawings as FIG. 2-FIG. 6 is oriented in the same relative disposition as FIG. 5 in order to facilitate comparison.

DESCRIPTION OF AN EXEMPLARY EMBODIMENT

Figure 1:
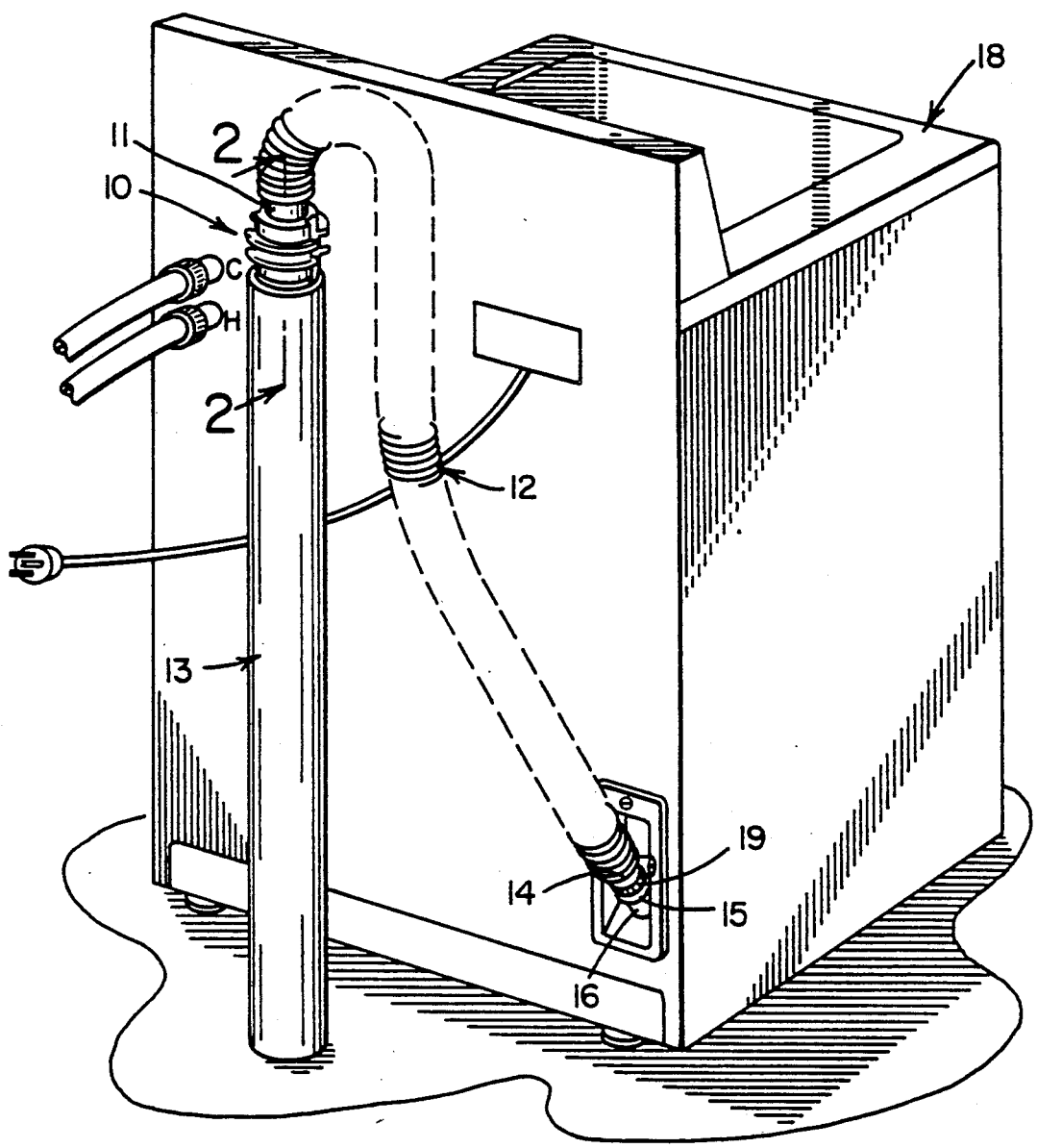
FIG. 1 is a schematic, rear perspective of a household appliance in the nature of a washing machine and depicting one end of a drain hose secured to the discharge tube of that appliance in a conventional manner and further depicting a universal adaptor embodying the concepts of the present invention presented from the second end of the drain hose and operatively communicating with the standpipe of a household sanitary system.

One representative form of an improved, universal drain hose adaptor embodying the concepts of the present invention is designated generally by the numeral 10 on the accompanying drawings. As depicted in FIG. 1, the representative adaptor 10 is presented from the first end portion 11 of a drain hose 12 for effecting an operable connection between the drain hose 12 and a standpipe 13 provided by the household sanitary system (the remainder of which is not shown). The second end portion 14 of the drain hose 12 may be fitted with an inlet cuff 15 in the configuration of any one of many varieties currently employed for connection to the discharge tube 16 of a household appliance 18, such as the washing machine schematically depicted.

The inlet cuff 15 may be manufactured by well known molding practices and methods using thermoplastic materials. For example, the drain hose 12 may be made of polypropylene that can be integrally molded to both the inlet cuff 15 and the adaptor 10. The inlet cuff 15 presented from the drain hose 12 is normally secured to the discharge tube 16 of the appliance 18 by a clamp, one well known example of which is designated by the numeral 19. As represented, the drain hose 12 is typically flexible and corrugated to accommodate a wide range of distances—both vertical and lateral—between the discharge tube 16 and the standpipe 13 in order to facilitate installation of the drain hose therebetween.

Figure 3:
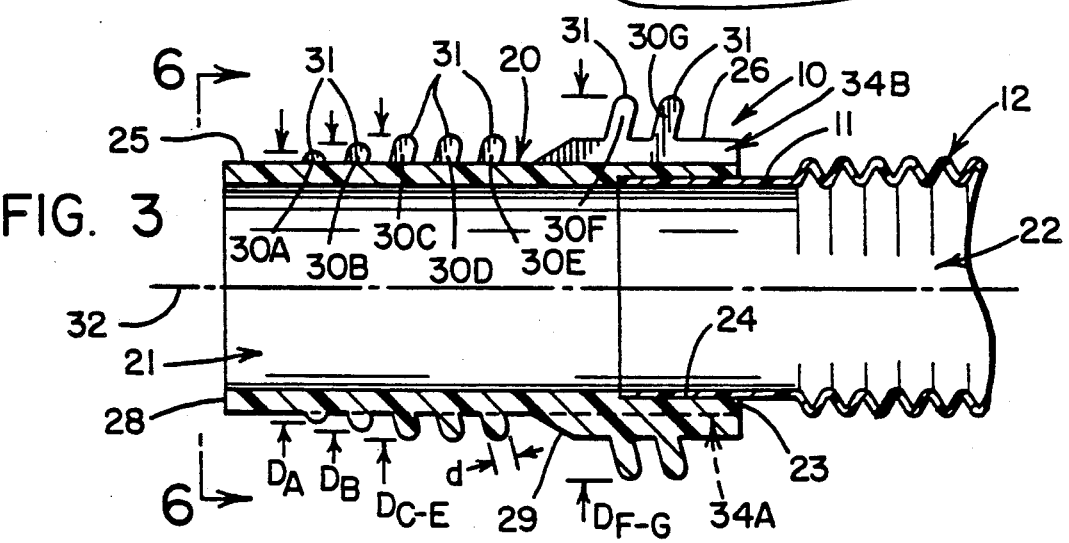
FIG. 3 is a longitudinal section similar to FIG. 2, except that the universal adaptor is not shown in combination with a standpipe in order to facilitate the viewer's understanding—FIG. 3 may also be identified as having been taken substantially along line 3—3 of FIG. 4, and FIG. 3 appears on the same sheet of drawings as FIG. 1.

With particular reference to FIG. 3, the adaptor 10 may have a body portion 20 which circumscribes an interior passageway 21 which communicates, and is preferably aligned, with the hollow interior 22 of the drain hose 12. The passageway 21 through the body portion 20 may be cylindrical and should be of substantially the same internal diameter as the effective internal diameter of the drain hose 12. As such, that end 23 of the body portion 20 which is proximal to the first end portion 11 of the drain hose 12 may be recessed, as at 24, to receive the end portion 11 of the drain hose 12.

The exterior of the body portion 20 is preferably stepped to provide first and second exterior surface portions 25 and 26. The exterior surface portions 25 and 26 are preferably cylindrical, although the first exterior portion 25, which extends axial from the distal end 28 of the body portion 20, is preferably of lesser outside diameter than the outside diameter of the second exterior portion 26. To prevent stress concentrations in the body portion 20 at the juncture of the first and second exterior surface portions 25 and 26, those surface portions may be conjoined with a conical, transitional portion 29.

The exterior surface portions 25 and 26 present a plurality of substantially frustro-conical fins 30 which project radially outwardly from the body portion 20. As is, perhaps, best seen by reference to FIG. 3, a single fin 30A, a single fin 30B and three fins 30C-30E project conically outwardly from exterior surface 25, and a pair of fins 30F and 30G project conically outwardly from the exterior surface 26.

As may be apparent from the previous paragraph, and as utilized in the detailed description which follows, a particular structural member, component or arrangement may be duplicated within the structure of the invention. When referring generally to that type of structural member, component or arrangement a common numerical designation shall be employed. However, when one of the structural members, components or arrangements so identified is to be individually identified it shall be referenced by virtue of a letter suffix employed in combination with the numerical designation utilized for general identification of that structural member, component or arrangement. Thus, there are a plurality of fins which are generally identified by the numeral 30, but the specific, individual fins are, therefore, identified as 30A through 30G in the specification and on the drawings. This same suffix convention shall be employed throughout the specification.

Each fin 30 is preferably frustro-conical. That is, the fins 30 each have a conically tampering orientation, even though each fin is of a fairly constant cross sectional dimension "d" and terminates in a rounded, preferably semi-cylindrical, outer edge 31. In addition, the conically tapered fins 30 are the frustrums of a true cone inasmuch as the fins 30 do not extend to an apex but rather terminate as they intersect the outer surface portions 25 and 26 of the body portion 20. Typically, the fins 30 are tapered at approximately 15 degrees with respect to the longitudinal axis 32 of the body portion 20. The imaginary apices would be spaced along the longitudinal axis 32 of the body portion 20, and for verbal orientation it should recognized that each imaginary apex would be located in closer proximity to the distal end 28 of the body portion 20 than the particular fin 30 associated therewith. As such, it is accurate to describe the disposition of the fins 30 by stating that they project, or taper, conically outwardly toward the proximal end 23 of the body portion 20.

As will hereinafter be more fully understood, the fins 30 must have an appropriate configuration, and also be sufficiently flexible to permit insertion of the necessary, individual fins 30A through 30D within the cylindrical interior surface 33 of the customarily encountered standpipe 13. The same configuration and flexibility which permits facile insertion of the fins 30 must also generate sufficient retention forces between the outer edge 31 of those fins 30 which engage the standpipe 13 and the cylindrical interior surface 33 of the standpipe 13 in order to resist inadvertent withdrawal of the adaptor 10, once properly inserted. The conical taper of the fins 30 is disposed to facilitate insertion without presenting a sharp corner, or ledge, that would interfere with insertion. By forming the body portion 20 of a thermoplastic rubber those fins 30 insertably received within the standpipe 13 will also have sufficient resilience to expand against the interior surface 33 and resist inadvertent withdrawal of the adaptor 10 from the standpipe 13.

Each fin 30 is also circumferentially discontinuous. That is, diametral grooves 34A and 34B extend axially along the body portion 20. The base 35 of each groove 34 extends axially along the first exterior surface 25 (with the sides thereof being formed by the discontinuity of the fins 30) and continues as an axial recess through the transitional portion 29 and axially along the second exterior surface 26. When the coupler 10 is insertably received within a standpipe 13, the grooves 34 form oppositely disposed siphon-break passages 36, as best seen in FIGS. 2, 4 and 5.

The outer diameter of the exterior surface 25 is less than the smallest internal diameter of a standpipe 13 which the installer will likely to encounter. In this regard it has been found that the typical standpipe 13 generally encountered in locations where the present invention will be used have internal diameters that fall within the range of from about 1.45 to about 2.05 inches. To assure compatibility between the universal adaptor 10 and a standpipe 13 with the smallest internal diameter likely to be encountered, the outer diameter of the exterior surface 25 may preferably be about 1.38 inches.

Consistent with the aforesaid dimensions, the outside diameter $D_A$ of the smallest fin 30A should preferably be about 1.50 inches. The fin 30A will thus seat against the internal diameter of the smallest of standpipe 13 that is likely to be encountered. The fin 30B preferably has an outside diameter $D_B$ of about 1.60 inches. Inasmuch as the fins 30 are flexible, the installer can, with the application of a modest amount of force, cause the fin 30B to deflect to the extent necessary for insertion into a standpipe 13 having an internal diameter of as little as approximately 1.50 inches. Such a fit will tend to ensure that sufficient retention forces are present to maintain the fin 30B within the standpipe 13.

The fins 30C–30E may have the same outside diameters $D_{C-E}$, respectively, which may be about 1.70 inches. The use of a constant diameter for the intermediate fins 30C through 30E will ensure stability of the adaptor 10 in standpipes having larger diameters. If desired, the fins 30C–30E can be molded to have progressively increasing outside diameters. However, it has been found that the majority of the standpipes presently installed can best be accommodated by the use of the constant diameter intermediate fins 30C–30E. The fins 30C–30E are also preferably flexible so that, with sufficient force, they can be deflected sufficiently to be insertably received within a standpipe 13 having internal diameters of lesser dimension than the outside diameters of those fins.

The largest fins 30F and 30G also have the same outside diameters $D_{F-G}$, which, in the exemplary embodiment, may be on the order of about 2.15 inches. The fins 30F and 30G will, therefore, be insertably receivable, and retainable, within a standpipe 13 having the largest internal diameter likely to be encountered.

One might, of course, provide fins 30 having a configuration such that each successive fin has an outside diameter that is stepped with respect to the preceding fin. That same continuously stepped arrangement might also be achieved by having the exterior of the body portion present a conically tapered outside surface with each individual fin having a fixed radial dimension. That arrangement would also provide a continuously stepped outside diameter for each successive fin. However, these alternatives require more complex molding dies and are, therefore, subject to higher manufacturing costs. Thus, the exemplary configuration shown and described is considered most appropriate for the majority of installations that will be encountered.

The foregoing description of an exemplary embodiment of the present invention has been presented for the purposes of illustration and description. It is not intended to be exhaustive nor to limit the invention to the precise form disclosed. Modifications, or variations, are certainly possible in light of the foregoing teachings. The exemplary embodiment was chosen and described to provide the best illustration of the principles of the invention as well as a practical application thereof in order to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a universal adaptor embodying the concepts of the present invention provides an operable connection between the drain hose employed with a household appliance and the standpipe of a household sanitary system but also accomplishes the other objects of the invention.

I claim:

1. A universal adaptor for effecting a connection between a drain hose and a standpipe, said adaptor comprising:
    a body portion having proximal and distal ends;
    a passageway extending axially through said body portion and opening through said proximal and distal ends;
    said proximal end adapted to be secured to the drain hose;
    said body portion also having at least one outer surface;
    a plurality of frustro-conical fin means projecting outwardly from said outer surface;
    said fin means having progressively stepped outer diameters with that fin having the smallest outer diameter being located closest to said distal end and with that fin having the largest outer diameter being located closest to said proximal end for engaging said standpipes having inner, diametral dimensions falling within a predetermined range, and wherein said fin means are circumferentially discontinuous.

2. A universal adaptor, as set forth in claim 1, wherein:
    said fins are sufficiently flexible to deflect axially toward said proximal end, thereby permitting insertion of the adaptor into seating engagement with a standpipe having an inner diameter at least slightly less than the predetermined outer diametral dimension of at least selected fins.

3. In combination, a universal adaptor and a drain hose having opposite ends, said adaptor comprising:
   a body portion having proximal and distal ends;
   a passageway extending axially within said body portion to open through said proximal and distal ends;
   said proximal end being secured to one end of said drain hose;
   said body portion having an outer surface;
   a plurality of frustro-conical fins projecting outwardly from said outer surface;
   said fins having progressively stepped outside diameters increasing from the outside diameter of said fin located closest to said distal end to the outside diameter of said fin located closest to said proximal end, and wherein said fins are circumferentially discontinuous to form a siphon-break passage.

4. The combination set forth in claim 3 wherein:
   said fins are sufficiently flexible to deflect axially toward said proximal end, thereby permitting insertion of the adaptor into seating engagement with a standpipe having an inner diameter only slightly less than the predetermined outer diametral dimension of at least selected fins.

5. The combination set forth in claim 4 wherein:
   the outer surface of said body portion has at least two stepped portions with the outer surface located in proximity to said distal end being of lesser diameter than the outer surface portion located in proximity to said proximal portion.

6. The combination set forth in claim 5 wherein:
   said first and second outer surfaces are joined by a conical transition portion.

7. A hollow drain hose for effecting an attachment between a household appliance and the standpipe of a household sanitary system, said drain hose comprising:
   a standpipe adaptor presented from the drain hose;
   said standpipe adaptor having a body portion with at least one substantially cylindrical outer surface extending between a proximal and a distal end of the body portion;
   at least said distal end of said body portion having an outer diameter falling in the range of from about 1.35 to about 1.42 inches;
   a passageway extending through said body portion and communicating with the hollow interior of the drain hose;
   said body portion having a plurality of flexible, frustro-conical fins projecting outwardly from said outer surface of said body portion;
   said fins having stepped, outer diameters falling in the range of from about 1.46 to about 2.19 inches with the diameter of that fin closest to said distal end being smaller than the outer diameter of that fin closest said proximal end for operatively engaging standpipes having inner diameters falling within a predetermined range of from about 1.45 to about 2.00 inches, and wherein said fins are circumferentially discontinuous to provide a siphon-break passage extending axially along said body portion.

* * * * *